(12) United States Patent
Torii (10) Patent No.: US 11,686,916 B2
(45) Date of Patent: Jun. 27, 2023

(54) LENS BARREL, IMAGING APPARATUS, AND IMAGING SYSTEM

(71) Applicant: CANON KABUSHIKI KAISHA, Tokyo (JP)

(72) Inventor: Shigehiro Torii, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 197 days.

(21) Appl. No.: 17/365,596

(22) Filed: Jul. 1, 2021

(65) Prior Publication Data

US 2022/0011534 A1     Jan. 13, 2022

(30) Foreign Application Priority Data

Jul. 7, 2020  (JP) .............................. JP2020-116992

(51) Int. Cl.
*G02B 7/02*     (2021.01)
(52) U.S. Cl.
CPC .................................. *G02B 7/025* (2013.01)
(58) Field of Classification Search
CPC ..................................................... C03C 17/34
See application file for complete search history.

(56) References Cited

U.S. PATENT DOCUMENTS

2013/0063655 A1 *  3/2013  Hsu ........................ H04N 23/55
                                                         156/303.1

FOREIGN PATENT DOCUMENTS

JP         2019179076 A     10/2019

* cited by examiner

*Primary Examiner* — James C. Jones
(74) *Attorney, Agent, or Firm* — Canon U.S.A., Inc. I.P. Division (57) ABSTRACT

A lens barrel includes a lens and a holding barrel configured to hold the lens. The holding barrel includes a holding unit configured to hold the lens, a plurality of adhesion portions at which the lens held by the holding unit is fixed to the holding barrel by an adhesive, and a plurality of caulking portions at which the lens held by the holding unit is fixed to the holding barrel by caulking the lens. Each of the plurality of adhesion portions and each of the plurality of caulking portions are spaced apart in a circumferential direction of the holding barrel, on a plane orthogonal to an optical axis of the lens.

10 Claims, 6 Drawing Sheets

FIG.6

LENS BARREL, IMAGING APPARATUS, AND IMAGING SYSTEM

BACKGROUND

Field of the Disclosure

The present disclosure relates to a lens barrel, an imaging apparatus, and an imaging system.

Description of the Related Art

As a method of fixing a lens in a lens barrel, a fixing method by caulking and a fixing method by adhesion are each conventionally known. In Japanese Patent Application Laid-Open No. 2019-179076, in order to improve the strength of fixing a glass lens arranged inside a lens barrel, a lens holder holding the lens has a groove for adhesive for holding the lens by adhesion, and a claw portion for holding the lens by caulking in the groove for adhesive.

In the lens holder discussed in Japanese Patent Application Laid-Open No. 2019-179076, the strength of fixing the lens is improved by forming the adhesion groove and the caulking claw in the same phase and holding the lens thereby, but a load on the lens locally increases, so that the lens can easily deform. Accordingly, there is such an issue that surface distortion of the lens may occur, thereby decreasing optical performance of the lens barrel.

SUMMARY

A lens barrel includes a lens and a holding barrel configured to hold the lens, wherein the holding barrel includes a holding unit configured to hold the lens, a plurality of adhesion portions at which the lens held by the holding unit is fixed to the holding barrel by an adhesive, and a plurality of caulking portions at which the lens held by the holding unit is fixed to the holding barrel by caulking the lens, and wherein each of the plurality of adhesion portions and each of the plurality of caulking portions are spaced apart in a circumferential direction of the holding barrel, on a plane orthogonal to an optical axis of the lens.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to the attached drawings. In each of the drawings, identical members are provided with the same reference numeral and the description thereof will not be repeated.

Figure 1:
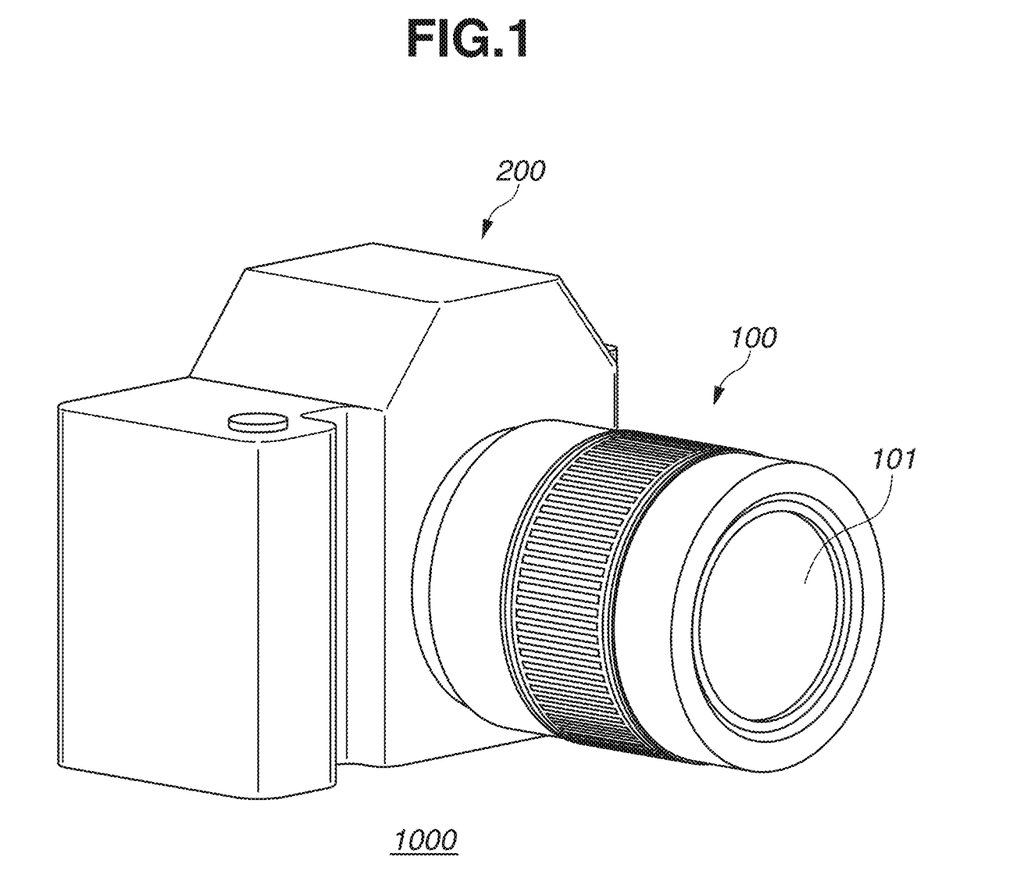
FIG. 1 is a perspective view of a lens barrel and a camera according to a first exemplary embodiment of the present disclosure.

FIG. 1 is a schematic diagram illustrating an imaging apparatus 1000 including a lens barrel 100 according to a first exemplary embodiment of the present disclosure. The imaging apparatus 1000 includes the lens barrel 100 as an interchangeable lens, and a camera body 200 on which the lens barrel 100 is removably mounted using a mount (not illustrated). The lens barrel 100 includes a lens unit 101. The lens barrel 100 further includes a control unit, a lens drive instruction unit, and a contact portion that can communicate with the camera body 200, although these components are not illustrated. The camera body 200 includes a control unit, an image sensor, and a contact portion that can communicate with the lens barrel 100, although these components are not illustrated. The imaging apparatus 1000 of the present exemplary embodiment is not limited to a camera system, and examples thereof include an interchangeable lens camera and a lens integrated camera. Examples of the camera include imaging apparatuses such as a digital still camera and a video camera.

The lens barrel 100 houses an image-capturing optical system that forms an optical image of an object (a subject). The lens unit 101 is a part of the image-capturing optical system. An image-capturing light beam from the object is focused on a light receiving surface (an imaging plane) of the image sensor, upon passing through the image-capturing optical system. The image sensor photoelectrically converts the optical image of the object formed by the image-capturing optical system.

Figure 2:
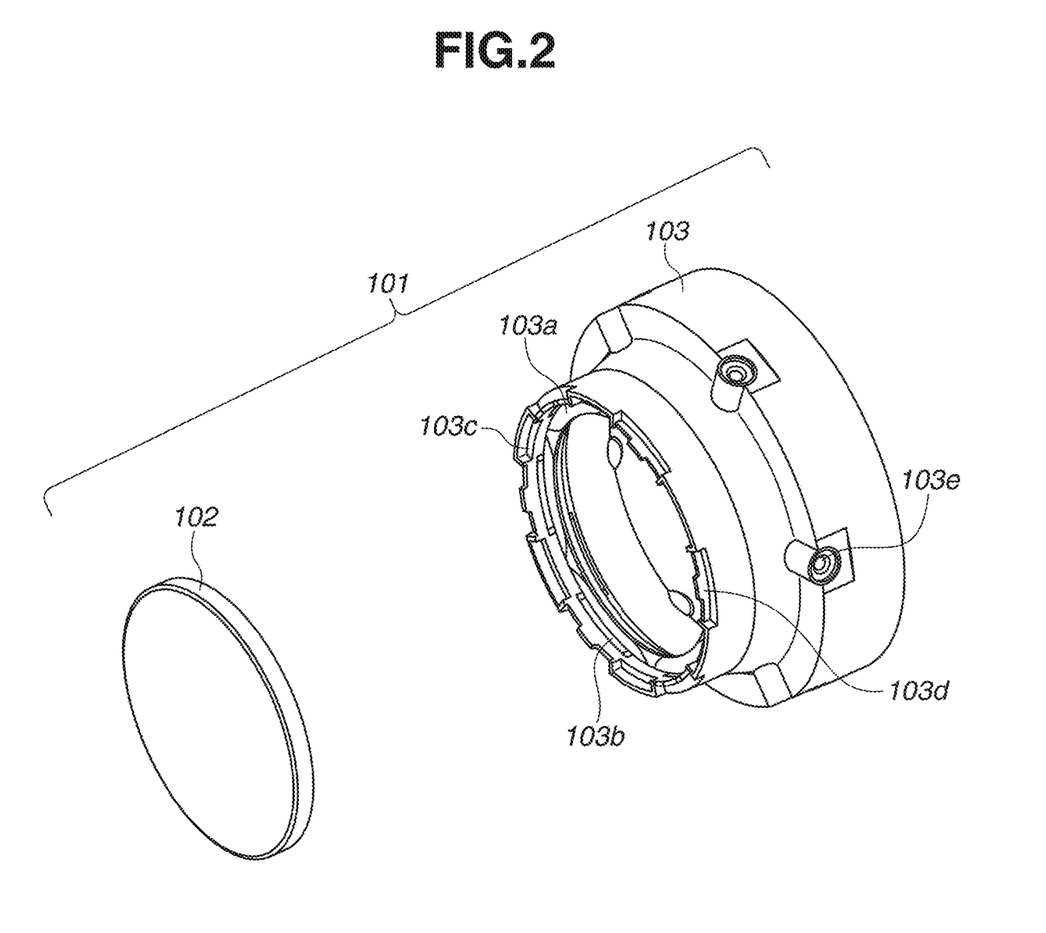
FIG. 2 is an exploded perspective view of a lens unit according to the first exemplary embodiment of the present disclosure.
Figure 3:
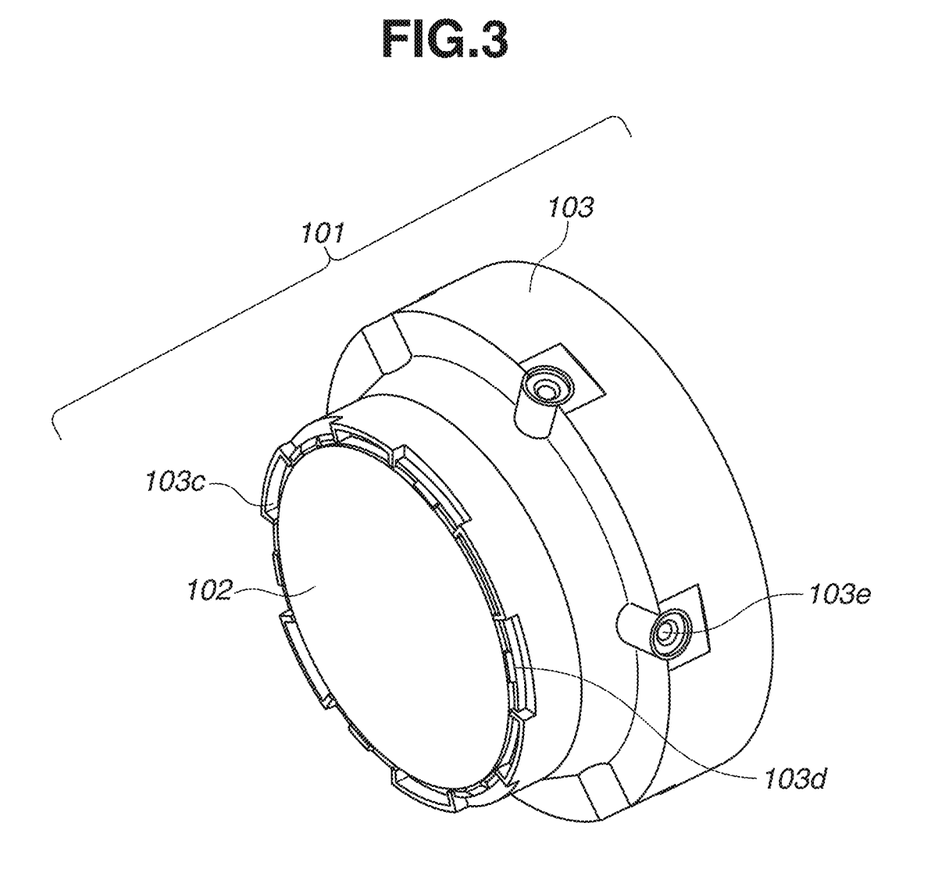
FIG. 3 is a perspective view of the lens unit according to the first exemplary embodiment of the present disclosure.

FIG. 2 is an exploded perspective view of a configuration of the lens unit 101 according to the first exemplary embodiment, and FIG. 3 is a perspective view of the configuration of the lens unit 101 according to the first exemplary embodiment.

The lens unit 101 includes a lens 102 and a holding barrel 103 that holds the lens 102. The lens 102 is held by a holding unit of the holding barrel 103. The holding unit includes a first holding portion 103a in contact with the lens 102 in an optical-axis direction, and a second holding unit 103b that is positioned on a side surface of the lens 102. The second holding unit 103b can be disposed with respect to the lens 102, by either diameter press-fit setting or diameter space setting having a space in a radial direction of the lens 102. The diameter space setting is desirable to reduce surface distortion of the lens 102.

The holding barrel 103 includes an adhesion groove portion 103c for fixing the lens 102 to the holding barrel 103. An adhesive 300 (see FIG. 4) is injected into the adhesion groove portion 103c. The adhesive 300 fixes the lens 102 to the holding barrel 103 while suppressing deformation of the lens 102 and reducing the surface distortion thereof. The holding barrel 103 further includes a caulking portion 103d. The caulking portion 103d is a portion where the lens 102 held by the holding unit is fixed to the holding barrel 103 by caulking the lens 102. The caulking portion 103d is integral with the holding barrel 103 to fix the lens 102 to the holding barrel 103 by thermal caulking. At the caulking portion 103d, a part of the holding barrel 103 can be deformed by application of heat, or a part of the holding barrel 103 can be deformed by application of a force. In this way, the lens 102 is fixed to the holding barrel 103 by caulking.

The holding barrel 103 can further include a cam follower holding unit 103e. The lens unit 101 including the holding barrel 103 is held in a fixing barrel (not illustrated) via a cam follower (not illustrated) by the cam follower holding unit 103e.

Figure 4:
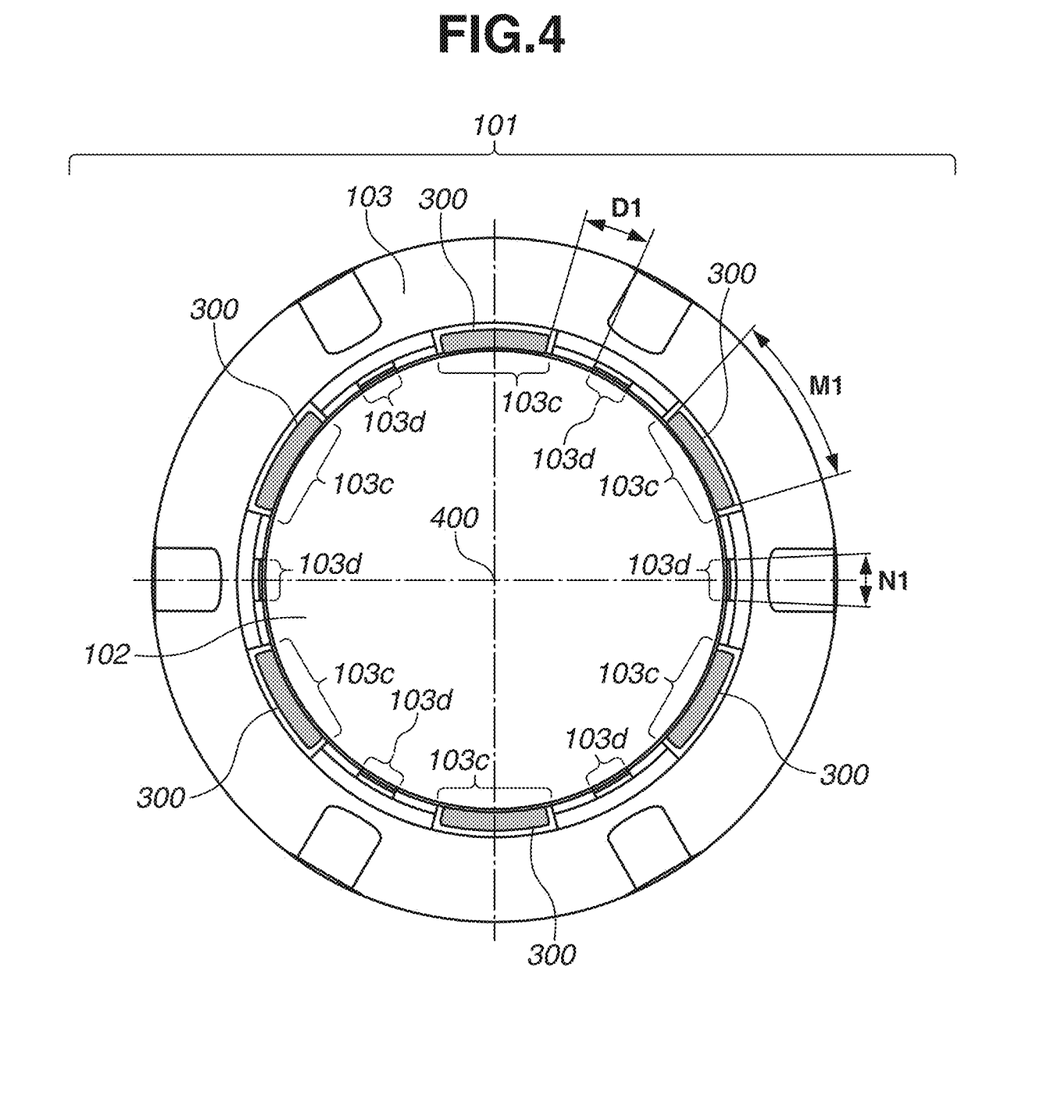
FIG. 4 is a front view of the lens unit according to the first exemplary embodiment of the present disclosure.

FIG. 4 is a front view of the lens unit 101 according to the first exemplary embodiment. In the first exemplary embodiment, a plurality of adhesion groove portions 103c and a plurality of caulking portions 103d of the holding barrel 103 are arranged on a circumference of the holding barrel 103 (the lens 102), on a plane orthogonal to an optical axis 400. The caulking portion 103d extends frontward in FIG. 4, and similarly, the adhesion groove portion 103c opens frontward in FIG. 4, so that a sufficient area is secured for the first holding portion 103a in contact with the lens 102 and the second holding unit 103b on the side surface of the lens 102.

In the first exemplary embodiment, the adhesive 300 fills the entire adhesion groove portion 103c. In other words, in the first exemplary embodiment, the adhesion portion at which the lens 102 is fixed by the adhesive 300 corresponds to the position of the adhesion groove portion 103c. Each of the plurality of adhesion portions (the adhesion groove portions 103c) and each of the plurality of caulking portions 103d are spaced apart in a circumferential direction of the holding barrel 103. In other words, each of the plurality of adhesion portions and each of the plurality of caulking portions 103d are spaced apart in the circumferential direction, with a distance D1 therebetween. Spacing these apart shortens a length per place (a fixing circumference M1) for fixing the lens 102 by the adhesive 300 and a length per place (a fixing circumference N1) for fixing the lens 102 by the caulking portion 103d. In this way, a place for fixing by the adhesive 300 and a place for fixing by the caulking portion 103d do not overlap, and thus the fixing circumference per place by the adhesive 300 or the caulking portion 103d is shortened. Therefore, a load per place applied to the lens 102 by the adhesive 300 or the caulking portion 103d is reduced, so that the deformation of the lens 102 can be suppressed and the surface distortion of the lens 102 can be reduced.

Moreover, because the caulking portion 103d is provided, a movement of the lens 102 is firmly regulated, so that the strength of fixing the lens 102 can be improved. It is more desirable that the fixing circumference M1 of the plurality of adhesives 300 and the fixing circumference N1 of the plurality of caulking portions 103d be short to reduce the surface distortion of the lens 102.

In the first exemplary embodiment, the number of the adhesion groove portions 103c and the number of the caulking portions 103d are the same, which is six. To suppress the deformation of the lens 102 and to reduce the surface distortion thereof, the number of the adhesion groove portions 103c on the circumference of the holding barrel 103 is at least three. Further, it is desirable for the plurality of adhesion portions (the adhesion groove portions 103c) to be equally spaced apart in the circumferential direction of the holding barrel 103. It is also desirable for the plurality of caulking portions 103d to be equally spaced apart in the circumferential direction of the holding barrel 103. The number of places of fixing by the adhesive 300 is larger than or equal to the number of places of fixing by the caulking portion 103d.

The lens fixing method in the present exemplary embodiment is to arrange the places of fixing by the adhesive 300 and the places of fixing by the caulking portion 103d not to overlap each other in the direction along the optical axis 400. Further, to reduce the surface distortion of the lens 102, the plurality of adhesion portions (the adhesives 300) and the plurality of caulking portions 103d are arranged not to overlap each other even in a radiation direction. Furthermore, it is not necessary to fill the entire adhesion groove portion 103c with the adhesive 300, and the adhesion groove portion 103c can be partially filled. The fixing circumference M1 can be determined depending on strength needed in holding the lens 102 with respect to the holding barrel 103.

Here, fixing by only the caulking portion 103d can be adopted as a way of fixing the lens 102 to the holding barrel 103. If the number of the locations of the caulking portions 103d is small, sufficient holding power cannot be secured. Accordingly, the number of the locations of the caulking portions 103d can be increased, and fixing by only the caulking portion 103d can be adopted. However, the load on the lens 102 in fixing by the caulking portion 103d is greater than the load on the lens in fixing by the adhesive 300, so that the deformation of the lens 102 increases and large surface distortion thereof occurs. Then, optical performance declines.

On the other hand, increasing the number of the locations of the adhesion groove portions 103c and fixing by only the adhesive 300 can also be adopted as the way of fixing the lens 102 to the holding barrel 103. However, the lens 102 is not mechanically regulated, and therefore, the adhesive 300 may peel off from the lens 102 because of thermal expansion or thermal contraction of the holding barrel 103 if a change in temperature of an environment where the lens barrel is used is large. In particular, in a high-temperature environment, the adhesive 300 peels off from the lens 102 or the holding barrel 103 accompanying thermal expansion of the holding barrel 103, so that the lens 102 may be decentered or tilted with respect to the holding barrel 103. When the lens 102 is decentered or tilted with respect to the holding barrel 103, the optical performance of the lens unit 101 declines.

Further, fixing by pinching the lens 102 with an elastic claw portion provided in place of the caulking portion 103d, in addition to fixing by the adhesive 300, can be adopted as the way of fixing the lens 102 to the holding barrel 103. However, the fixing strength of the elastic claw portion is less than that of the caulking portion 103d, and therefore, in a case where a change in temperature is large or a large external force due to a drop impact or the like is applied, the lens 102 may be decentered or tilted, so that the optical performance of the lens unit 101 may decline.

In the present exemplary embodiment, the plurality of adhesion groove portions 103c is provided as the adhesion portion, so that the occurrence of the surface distortion of the lens 102 can be suppressed by fixing the lens 102 using the adhesive 300. The plurality of caulking portions 103d is also provided, and therefore, the lens 102 is mechanically fixed by the caulking portion 103d, and this mechanical fixing can not only improve the fixing strength against the drop impact or the like of the lens 102, but also improve the fixing strength by suppressing the occurrence of decentering and tilting of the lens 102 in a high-temperature environment. Further, because each of the plurality of adhesion portions (the adhesives 300) and each of the plurality of caulking portions 103d are spaced apart, the fixing circumference per place of the lens 102 can be shortened. Thus, the load per place applied to the lens 102 can be reduced, so that the deformation can be suppressed and the surface distortion can be reduced. As a result, the reduction of the surface distortion of the lens 102 and the improvement of the fixing force can be achieved at the same time.

In this way, according to the lens barrel 100 of the present exemplary embodiment, it is possible to improve the optical performance of the lens barrel 100 by ensuring the fixing strength while suppressing the deformation due to fixing of the lens 102 to the holding barrel 103 and reducing the surface distortion of the lens 102.

Figure 5:
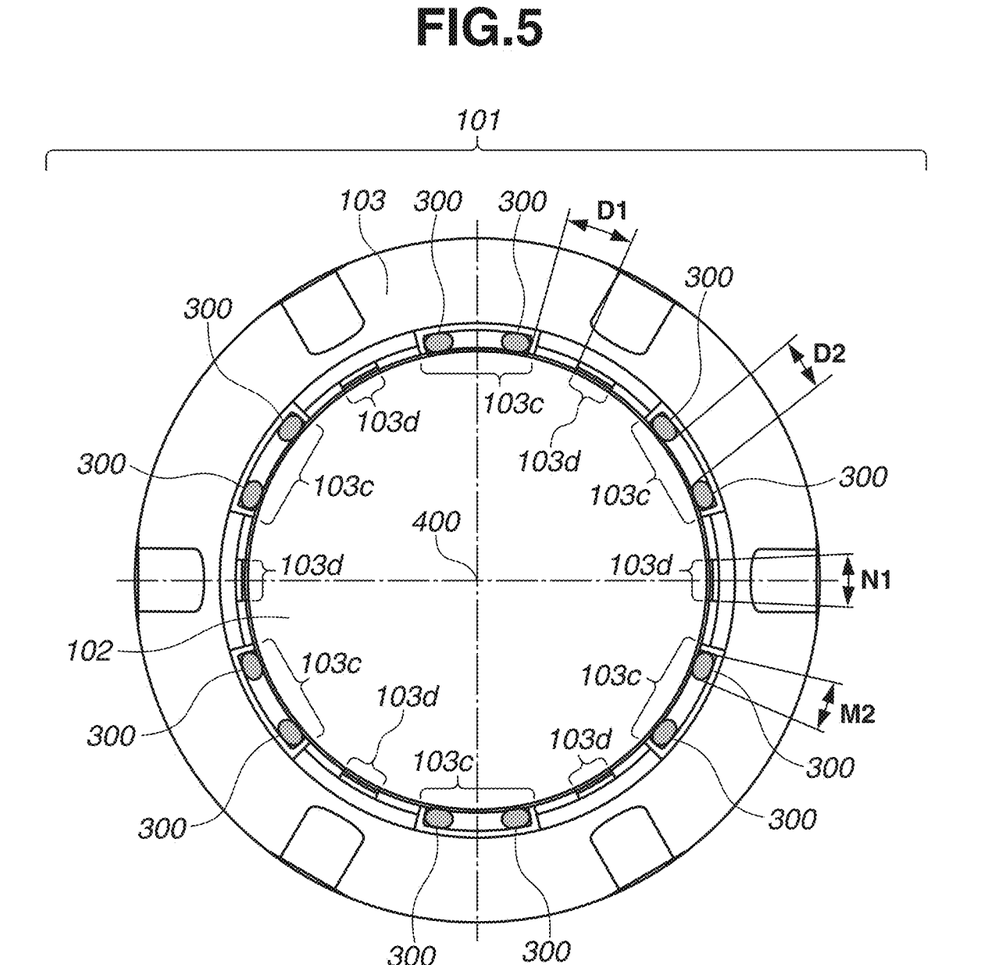
FIG. 5 is a front view of a lens unit according to a second exemplary embodiment of the present disclosure.

FIG. 5 is a front view of a lens unit 101 according to a second exemplary embodiment of the present disclosure. Here, a configuration different from that of the lens unit 101 described in the first exemplary embodiment will be described. In the first exemplary embodiment, the case where the application places of the adhesive 300 and the caulking portions 103d are alternately arranged on the circumference of the holding barrel 103 is described, but the arrangement is not limited to this case. In the second exemplary embodiment, the number of the locations of the adhesion groove portions 103c is the same (six) as that in the first exemplary embodiment, but the adhesion groove portion 103c is divided into a plurality of places to be filled with the adhesive 300. In other words, a plurality of (in the present exemplary embodiment, two) adhesion portions to which the adhesive 300 is applied is disposed between the plurality of caulking portions 103d. A fixing circumference M2 per place of the adhesive 300 filling the adhesion groove portion 103c is shortened by thus arranging the plurality of adhesion portions (the adhesives 300).

In the lens unit 101 of the second exemplary embodiment, the adhesives 300 are spaced apart and disposed at two locations for each of the adhesion groove portions 103c, i.e., at 12 locations in total. Each of the plurality of adhesion portions (the adhesives 300) and each of the plurality of caulking portions 103d are spaced apart in the circumferential direction, with a distance D1 therebetween. Further, the plurality of adhesion portions disposed in the adhesion groove portion 103c is spaced apart from each other in the circumferential direction, with a distance D2 therebetween. Spacing these apart shortens a length per place for fixing the lens 102 by the adhesive 300 and the caulking portion 103d. In the lens unit 101 of the second exemplary embodiment, the length per place (the fixing circumference M2) for fixing the lens 102 by the adhesive 300 is shorter than that in the first exemplary embodiment. Therefore, the load per place applied to the lens 102 by the adhesive 300 is reduced, so that the deformation can be suppressed and the surface distortion can be reduced.

More desirably, the filling places (application places) of the adhesive 300 on the circumference of the holding barrel 103 are more than the caulking portions 103d. The force for holding the lens 102 can be secured by providing the plurality of adhesion portions between the caulking portions 103d. Therefore, in the lens unit 101 of the second exemplary embodiment, it is possible to reduce the surface distortion of the lens 102 while ensuring the strength of fixing the lens 102 against an external force such as the drop impact. The number of the filling places of the adhesive 300 is not limited to 12 and can be increased.

Figure 6:
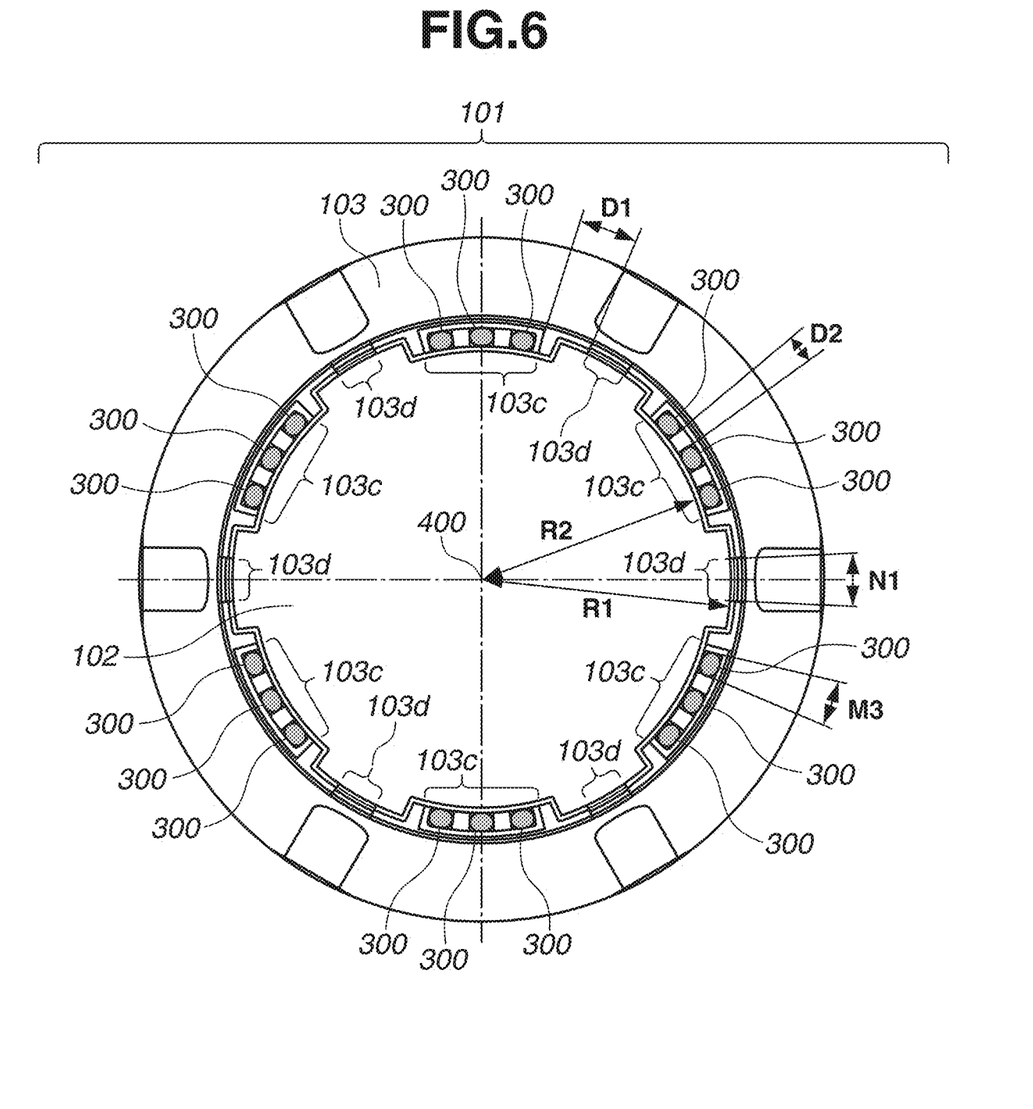
FIG. 6 is a front view of a lens unit according to a third exemplary embodiment of the present disclosure.

FIG. 6 is a front view of a lens unit 101 according to a third exemplary embodiment of the present disclosure. Here, a configuration different from the lens unit 101 described in the first exemplary embodiment will be described. In the first exemplary embodiment, there is described the case where an external diameter for fixing by the caulking portion 103d and an external diameter for fixing by the adhesion portion (the adhesive 300) in the lens 102 are the same, but the external diameters are not limited to be the same. In the third exemplary embodiment, an external diameter (a radius R1) for fixing by the caulking portion 103d is larger than an external diameter (a radius R2) for fixing by the application of the adhesive 300 in the lens 102. The external diameter for fixing by the caulking portion 103d can be smaller than the external diameter for fixing by the application of the adhesive 300.

In this way, the external diameter for fixing the lens 102 by the caulking portion 103d and that by the adhesion portion are different. In this case as well, each of the plurality of adhesion portions (the adhesion groove portions 103c) and each of the plurality of caulking portions 103d are spaced apart in the circumferential direction of the holding barrel 103. In other words, each of the plurality of adhesion portions and each of the plurality of caulking portions 103d are spaced apart in the circumferential direction of the holding barrel 103, with a distance D1 therebetween. Spacing these apart shortens a length per place (a fixing circumference N1) for fixing the lens 102 by the caulking portion 103d. Therefore, the load per place applied to the lens 102 by the caulking portion 103d is reduced, so that the deformation of the lens 102 can be suppressed and the surface distortion of the lens 102 can be reduced.

In the first exemplary embodiment, the case where the adhesion groove portion 103c between the caulking portions 103d consists of one groove is described, but the adhesion groove portion 103c can have a different structure. In the third exemplary embodiment, the adhesion groove portion 103c is divided into three grooves, and each of the grooves is filled with the adhesive 300. In the holding barrel 103 illustrated in FIG. 6, each of the adhesion groove portions 103c at six locations is divided, and thus the adhesive 300 fills the groove at each of 18 locations in total. The filling places of the adhesive 300 is not limited to 18 locations and can be increased. In this way, the plurality of adhesion portions in the adhesion groove portion 103c is spaced apart from each other in the circumferential direction, with a distance D2 therebetween.

In the lens unit 101 of the third exemplary embodiment, a length per place (a fixing circumference M3) for fixing the lens 102 by the adhesive 300 is shorter than that in the first exemplary embodiment. Accordingly, the load per place applied to the lens 102 by the adhesive 300 is reduced, so that the deformation can be suppressed and the surface distortion can be reduced. In addition, because the number of the application places (adhesion portions) of the adhesive 300 is larger than that of the second exemplary embodiment, the strength of fixing the lens 102 against an external force such as the drop impact can be improved. Therefore, in the lens unit 101 of the third exemplary embodiment, it is possible to reduce the surface distortion of the lens 102 while ensuring the strength of fixing the lens 102 against an external force such as the drop impact.

The imaging apparatus 1000 (an imaging system) includes the camera body 200 including the image sensor for receiving light from the lens barrel 100 and the lens barrel 100 removably mounted on the camera body 200, but is not limited to this configuration. The imaging apparatus 1000 can be an apparatus in which the camera body 200 and the lens barrel 100 are integrally configured.

According to each of the exemplary embodiments of the present disclosure, it is possible to provide the lens barrel 100 in which the surface distortion of the lens 102 is reduced and the strength of fixing the lens 102 is improved. The exemplary embodiments of the present disclosure are described above, but the present disclosure is not limited to these exemplary embodiments, and various alterations and modifications can be made within the scope of the gist thereof.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2020-116992, filed Jul. 7, 2020, which is hereby incorporated by reference herein in its entirety.

What is claimed is:

1. A lens barrel comprising:
a lens; and
a holding barrel configured to hold the lens,
wherein the holding barrel includes
a holding unit configured to hold the lens,
a plurality of adhesion portions at which the lens held by the holding unit is fixed to the holding barrel by an adhesive, and
a plurality of caulking portions at which the lens held by the holding unit is fixed to the holding barrel by caulking the lens, and
wherein each of the plurality of adhesion portions and each of the plurality of caulking portions are spaced apart in a circumferential direction of the holding barrel, on a plane orthogonal to an optical axis of the lens.

2. The lens barrel according to claim 1, wherein the plurality of caulking portions is formed integrally with the holding barrel.

3. The lens barrel according to claim 1, wherein the adhesive is applied into an adhesion groove in the holding barrel at the plurality of adhesion portions.

4. The lens barrel according to claim 1, wherein each of the plurality of adhesion portions is disposed between the pluralities of caulking portions, in the circumferential direction of the holding barrel.

5. The lens barrel according to claim 4, wherein at least two adhesion portions are disposed in each space between the pluralities of caulking portions.

6. The lens barrel according to claim 1, wherein the number of the plurality of caulking portion to be disposed is at least three.

7. The lens barrel according to claim 1, wherein the plurality of caulking portions is equally spaced apart in the circumferential direction of the holding barrel.

8. The lens barrel according to claim 1, wherein the plurality of adhesion portions is equally spaced apart in the circumferential direction of the holding barrel.

9. An imaging apparatus comprising:
a lens barrel; and
an image sensor configured to receive light from the lens barrel,
wherein the lens barrel includes
a lens, and
a holding barrel configured to hold the lens,
wherein the holding barrel includes
a holding unit configured to hold the lens,
a plurality of adhesion portions at which the lens held by the holding unit is fixed to the holding barrel by an adhesive, and
a plurality of caulking portions at which the lens held by the holding unit is fixed to the holding barrel by caulking the lens, and
wherein each of the plurality of adhesion portions and each of the plurality of caulking portions are spaced apart in a circumferential direction of the holding barrel, on a plane orthogonal to an optical axis of the lens.

10. An imaging system comprising:
a lens barrel; and
an imaging apparatus on which the lens barrel is removably mounted,
wherein the lens barrel includes
a lens, and
a holding barrel configured to hold the lens,
wherein the holding barrel includes
a holding unit configured to hold the lens,
a plurality of adhesion portions at which the lens held by the holding unit is fixed to the holding barrel by an adhesive, and
a plurality of caulking portions at which the lens held by the holding unit is fixed to the holding barrel by caulking the lens, and
wherein each of the plurality of adhesion portions and each of the plurality of caulking portions are spaced apart in a circumferential direction of the holding barrel, on a plane orthogonal to an optical axis of the lens.

* * * * *